US006095655A

United States Patent [19]

[11] Patent Number: 6,095,655

Bigliati et al.

[45] Date of Patent: Aug. 1, 2000

[54] REFLECTOR FOR A LIGHTING DEVICE WITH AN ELONGATED LIGHT SOURCE

[75] Inventors: Claudia Bigliati, Trino; Piero Perlo, Sommariva Bosco; Piermario Repetto, Torino; Sabino Sinesi, Piossasco; Vito Lambertini, Giaveno, all of Italy

[73] Assignee: C.R.F. Societa Consortile per Azioni, Orbassano, Italy

[21] Appl. No.: 09/014,041

[22] Filed: Jan. 27, 1998

[30] Foreign Application Priority Data

Jan. 27, 1997 [IT] Italy .................................. T097A0059

[51] Int. Cl.[7] .............................. G02B 5/08; G02B 7/182

[52] U.S. Cl. ............................................ 359/853; 359/869

[58] Field of Search ..................................... 359/851, 853, 359/867, 868, 869

[56] References Cited

U.S. PATENT DOCUMENTS

| | | | |
|---|---|---|---|
| 4,359,265 | 11/1982 | Winston | 359/852 |
| 4,387,961 | 6/1983 | Winston | 359/867 |
| 5,289,356 | 2/1994 | Winston | 362/217 |
| 5,408,363 | 4/1995 | Kano | 359/869 |
| 5,586,013 | 12/1996 | Winston et al. | 362/347 |
| 5,699,201 | 12/1997 | Lee | 359/708 |

*Primary Examiner*—Cassandra Spyrou
*Assistant Examiner*—Mark A. Robinson
*Attorney, Agent, or Firm*—Sughrue, Mion, Zinn, Macpeak & Seas, PLLC

[57] ABSTRACT

A reflector (R) for a lighting device having a light source elongated in one direction has a three-dimensional curved shape which provides a maximum efficiency of the device with the required control on the direction of the light beam at the output.

16 Claims, 9 Drawing Sheets

REFLECTOR FOR A LIGHTING DEVICE WITH AN ELONGATED LIGHT SOURCE

FIELD OF THE INVENTION

The present invention relates to reflectors for lighting devices which make use of at least one light source elongated along one direction, such as fluorescent tube devices.

SUMMARY OF THE INVENTION

The object of the present invention is that of providing a reflector of the above indicated type which has the greatest possible output angle, or cut-off angle, of the light beam coming out of the device, as well as the required angular distribution of the light flow, while insuring maximum efficiency and minimum dimensions of the lighting device.

In order to achieve this object, the invention provides a reflector for lighting devices using one or more elongated sources, whose surface is characterized in that it has a continuous shape with different cross-sections in two main planes orthogonal to each other, said shape being expressed by the equation $$\xi=\lambda\rho_1+(1-\lambda)\rho_2, \quad (1)$$

where $\rho_1$ and $\rho_2$ represent the ideal CPC cross-sections in said planes of the reflector, with a pre-defined cut-off angle, and $\lambda$ is a weight function, determined on the basis of an output shape of the reflector which expresses the linear combination of $\rho_1$ and $\rho_2$ cross-sections.

BRIEF DESCRIPTION OF THE DRAWINGS

The invention will be now described with reference to the annexed drawings, given purely by way of non-limiting example, in which.

DETAILED DESCRIPTION OF THE INVENTION

Figure 1:
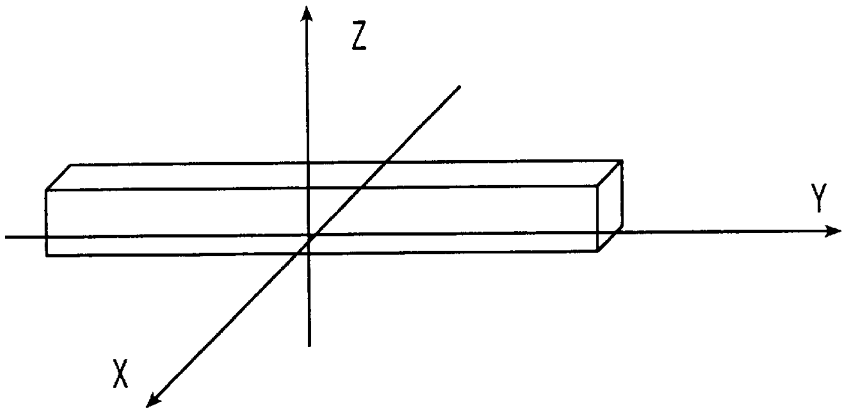
FIG. 1 is a diagrammatic assonometric view of a fluorescent tube to which the reflector according to the invention is applied.
Figure 2:
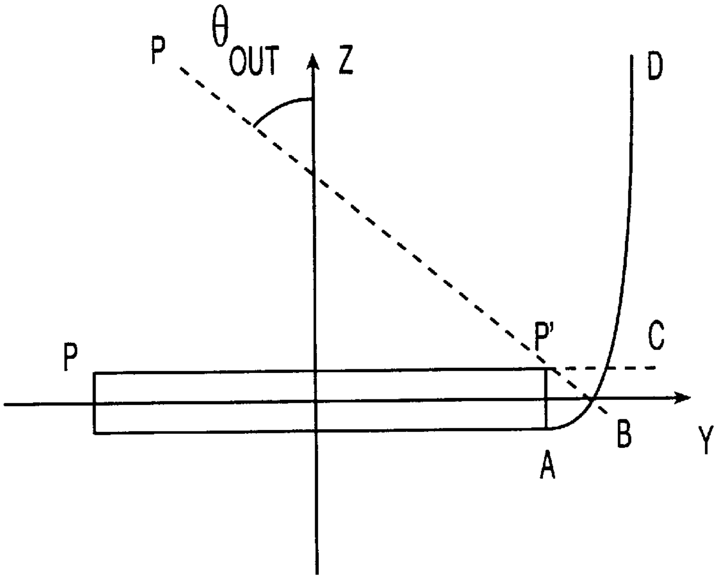
FIG. 2 is a view partially in cross-section taken along the plane yz of FIG. 1 of the fluorescent tube of FIG. 1 with the associated reflector.
Figure 3:
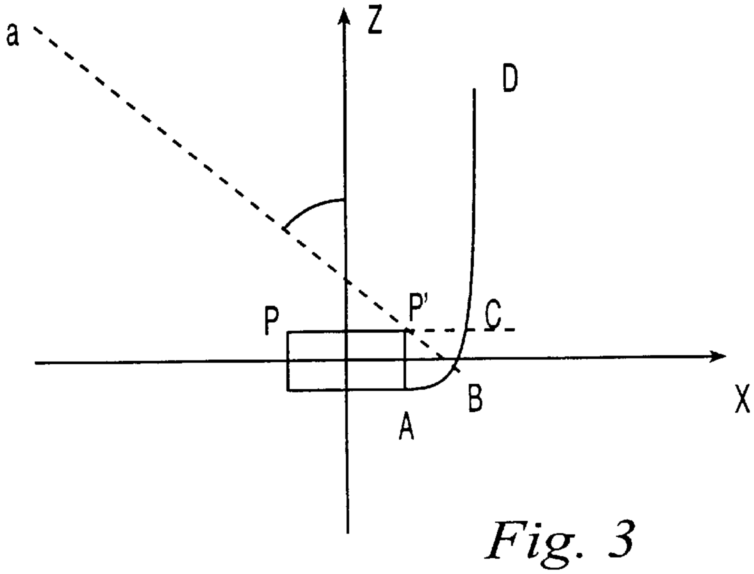
FIG. 3 is a view in cross-section in the plane xz of FIG. 1 of the fluorescent tube of FIG. 1 with associated reflector.

FIG. 1 diagrammatically shows a light source elongated in one direction and having a cross-section with a rectangular shape, as it is the case for instance in fluorescent tubes presently available in the market. FIGS. 2, 3 show the cross-sections of the reflector according to the invention respectively in planes yz and xz. The maximum output angle, or cut-off angle of the device, has been designated by $\theta_{out}$, whereas a designates the axis which is inclined with respect to the vertical z of the cut-off angle. FIGS. 2, 3 show the optimal profiles of the reflector for the two orthogonal cross-sections of the source, only one half of the reflector according to the invention being shown, the remaining half being symmetrical to that shown with respect to the vertical axis z. FIG. 2 shows the cross-section in the plane (z,y), while FIG. 3 shows the cross-section in plane (x,z). The portions AB, BC and CD are made in a way known per se in the field of design techniques of Compound Parabolic Concentrators (CPC): AB is a circle portion having P'A as radius, BC is an arch of a parabola having P'B as the focal length and the axis of the parabola being coincident with a, whereas CD is a portion of a parabola having its focus at point P' and its axis parallel to a.

According to the invention, the above described shape of the profile of the reflector is extended three-dimensionally, with the additional condition that the desired output shape of the reflector can be imposed.

Figure 4:
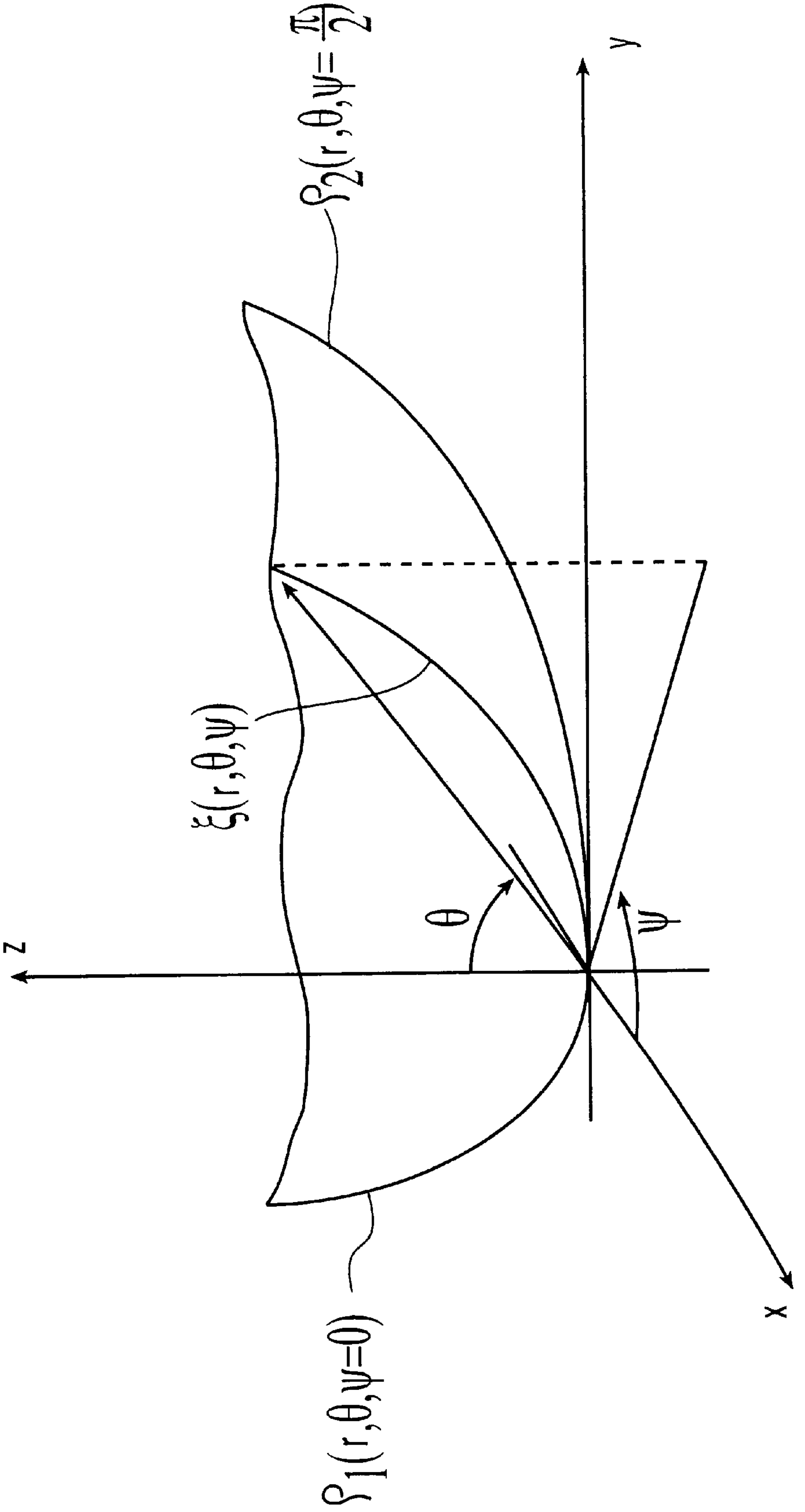
FIG. 4 is a geometric representation of the surface of the reflector according to the invention.

FIG. 4 diagrammatically shows the profiles $\rho_1$ and $\rho_2$ of the reflector according to the invention in the two planes (z, y) and (x, z). The surface of the three-dimensional reflector according to the invention which enables the light coming out of the device to be controlled can be obtained by the rotation of one of the two profiles, for example profile $\rho_1$ of FIG. 4, which, by a suitable variation, must become profile $\rho_2$ after a rotation of $\pi/2$. If the equation of the surface generated by this rotation is designated by $\xi(r,\theta,\Psi)$, this can be expressed in the following form:

$$\xi(r,\theta,\Psi)=\lambda(r,\theta,\Psi)\rho_1(r,\theta,\Psi)+(1-\lambda(r,\theta,\Psi))\rho_2(r,\theta,\Psi) \quad (1)$$

where $\lambda$ is a weight function whose explicit dependency from r,$\theta$ and $\Psi$ is determined by the imposed boundary conditions (output shape of the device) and the end values of the function, indicated herein under:

$$\lambda(r,\theta,\psi)=1 \quad \psi=0;$$

$$\lambda(r,\theta,\psi)=0 \quad \psi=\pi/2;$$

so that the surface thus obtained actually contains the two profiles.

The determination of the weight function by the relation (1) is not univocal. Therefore, this arbitrarily can be used in order to minimize the number of points of discontinuity of the reflecting surface of the device. This technique can be applied also to the case in which it is necessary to provide a gap between the source and the bottom of the reflector.

The optimal profiles of the reflector for the two cross-sections will differ from each other to an extent which depends upon the difference in dimensions of the two cross-sections. In order to join the two profiles with the criterion seen above it is useful to introduce two cut-off angles different from each other, so that they are rendered compatible with each other dimensionally. The choice of the cut-off angles is dictated therefore by the dimensions which one wishes to obtain.

Figure 10B:
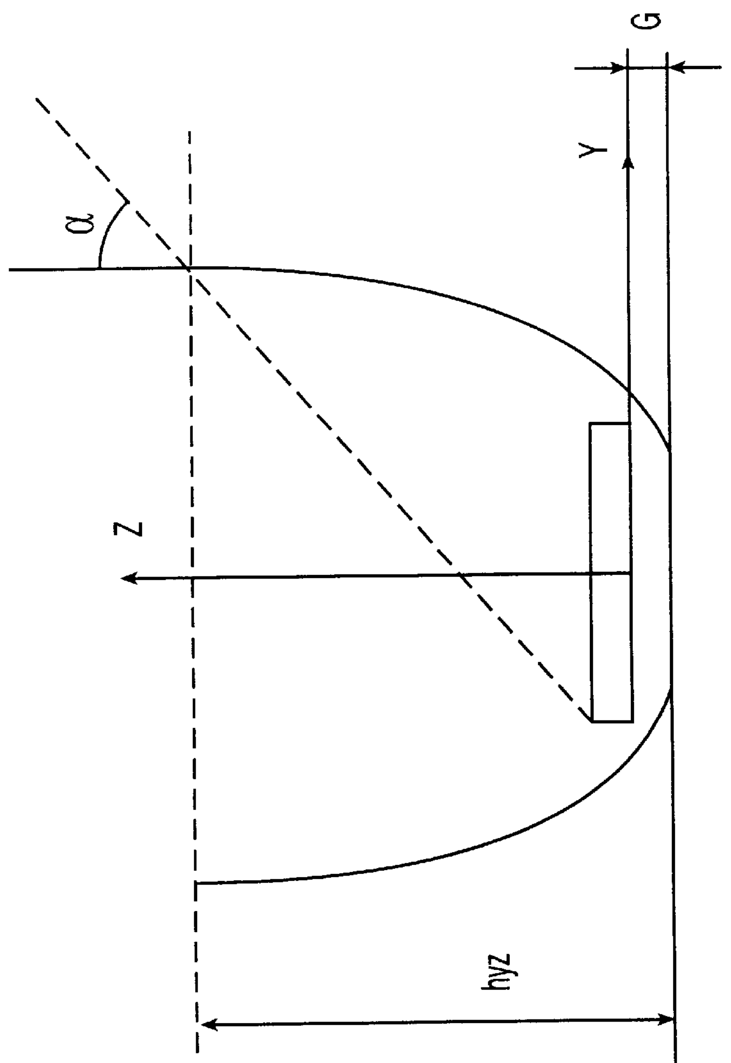
FIGS. 10A, 10B are cross-sectional views corresponding to those of FIGS. 3, 2 used to show the influence of the height of the reflector on the cut-off angle.
Figure 10A:
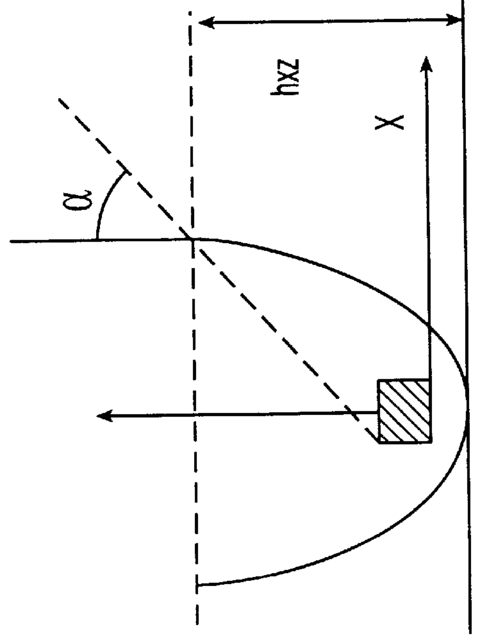

With reference to FIGS. 10A, 10B, the cut-off angle is designated there by $\alpha$. Since the extension of the source in the two cross-sections is different, also the heights $h_{z,x}$ and $h_{z,y}$ and the dimensions of the two profiles are different, as clearly apparent from these figures.

The revolution around the optical axis z of the optimal CPC profile calculated in the (z,y) cross-section of maximum extension of the source gives rise to a device which assures the proper cut-off angle and easiness of construction. This profile is truncated in order to limit the overall height G from the plane, where G is the gap between the source and the apex of the reflector.

Figure 11:
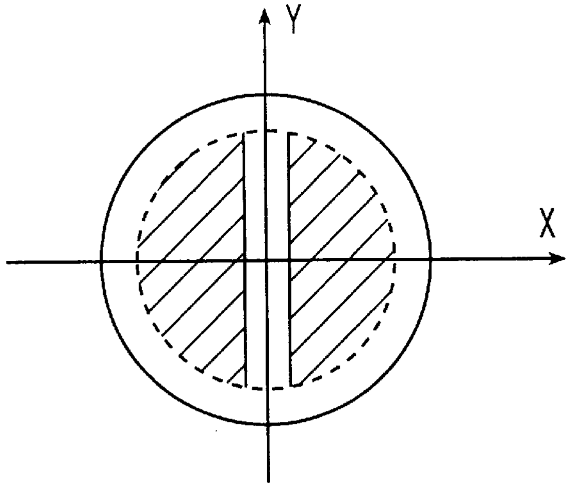
FIG. 11 is a plan view of the reflector of FIGS. 10A, 10B.

Some reflectors forming part of the state-of-the-art have the drawback that they include a substantially flat area which does not operate ideally for all the cross-sections different from the (z,y) cross-section. In FIG. 11, by dotted lines there is indicated this flat area. In particular, this area causes a reduction of the overall efficiency since the rays which are incident within the dotted area of FIG. 11 are in part subject to an average number of reflections greater than that which is ideally possible and in part return to the sources. Another drawback is a limited control of the distribution of the light beam, for instance at the two orthogonal cross-sections defined in planes (x, z) and (y, z), also designated $C_0$ and $C_{90}$ cross-sections. The intensity and the angular amplitude are substantially different. A further drawback due to the flat area derives from that a part of the rays reflected thereby go out of the cut-off angle calculated by defining a virtual source which is more elongated than the real source, particularly along the direction of maximum extension.

In a first embodiment of the present invention, the surface obtained from the revolution of the optimal profile calculated at cross-section (z, y) intercepts the "extrusion" surface of the ideal profile calculated at cross-section (z, x). The two surfaces are radiused, along the intersection line, according to known surface radiusing techniques, and give rise to a surface without any flat areas, which is more efficient since the average number of reflections of the rays is reduced, so as to provide a first control of the symmetry of the beam.

Figure 12:
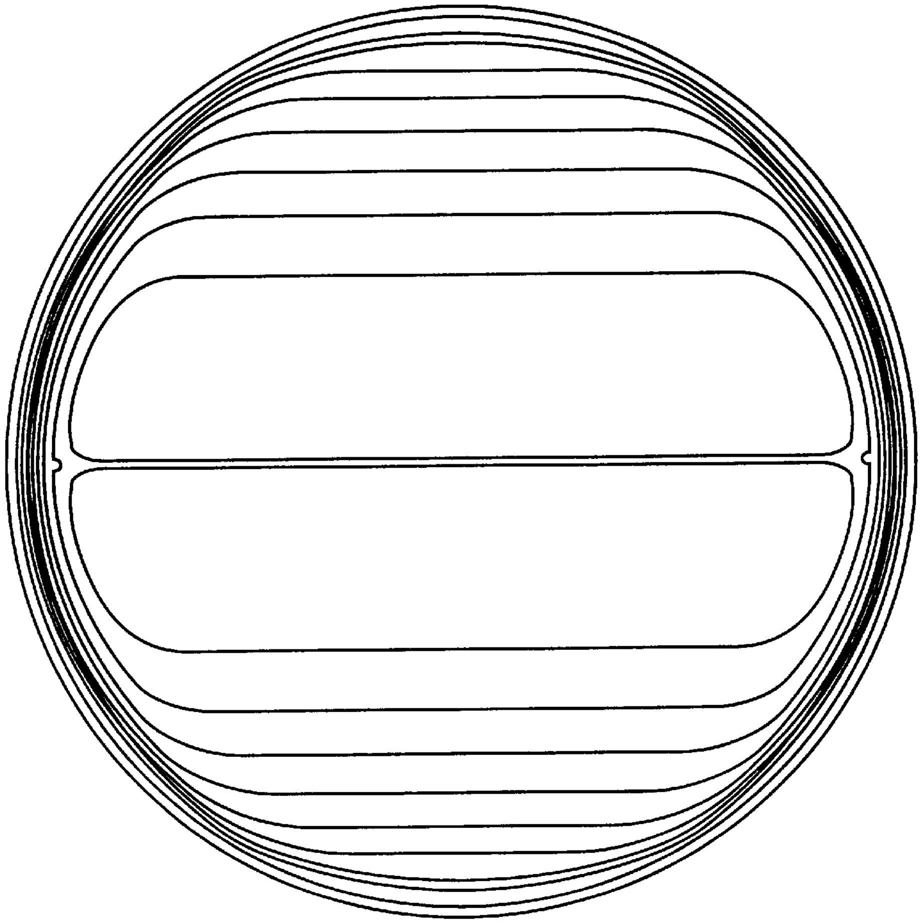
FIG. 12 is a plan view of the reflector, in which the surface of the latter is shown with various lines which represent the cross-section of the reflector in horizontal planes at different heights.

FIG. 12 shows the typical shape of the reflector represented by level curves.

Figures 5, 6:
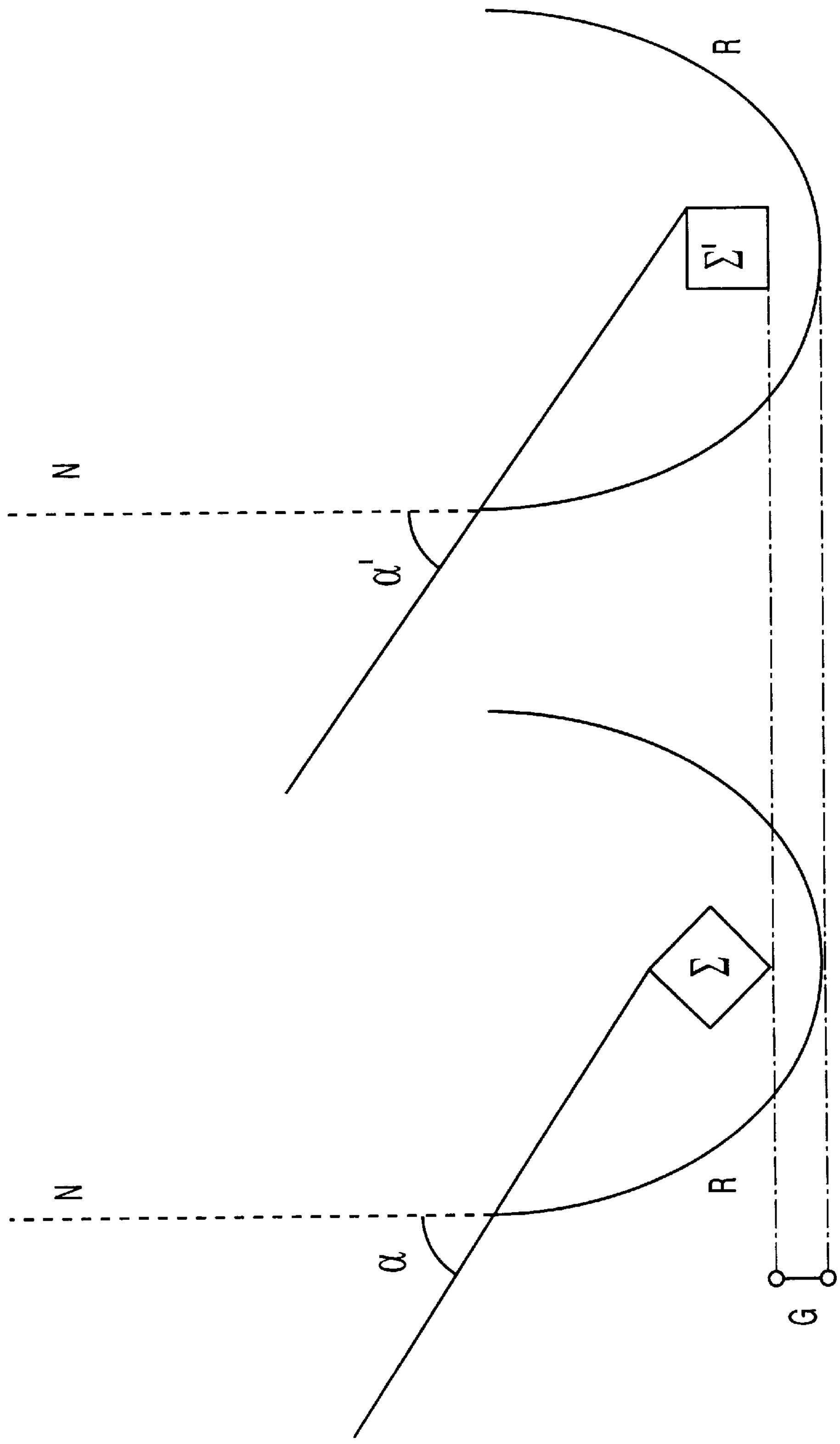
FIGS. 5, 6 are cross-sectional views in the plane xz of the reflector according to the invention with two different orientations of the light source.
Figure 7:
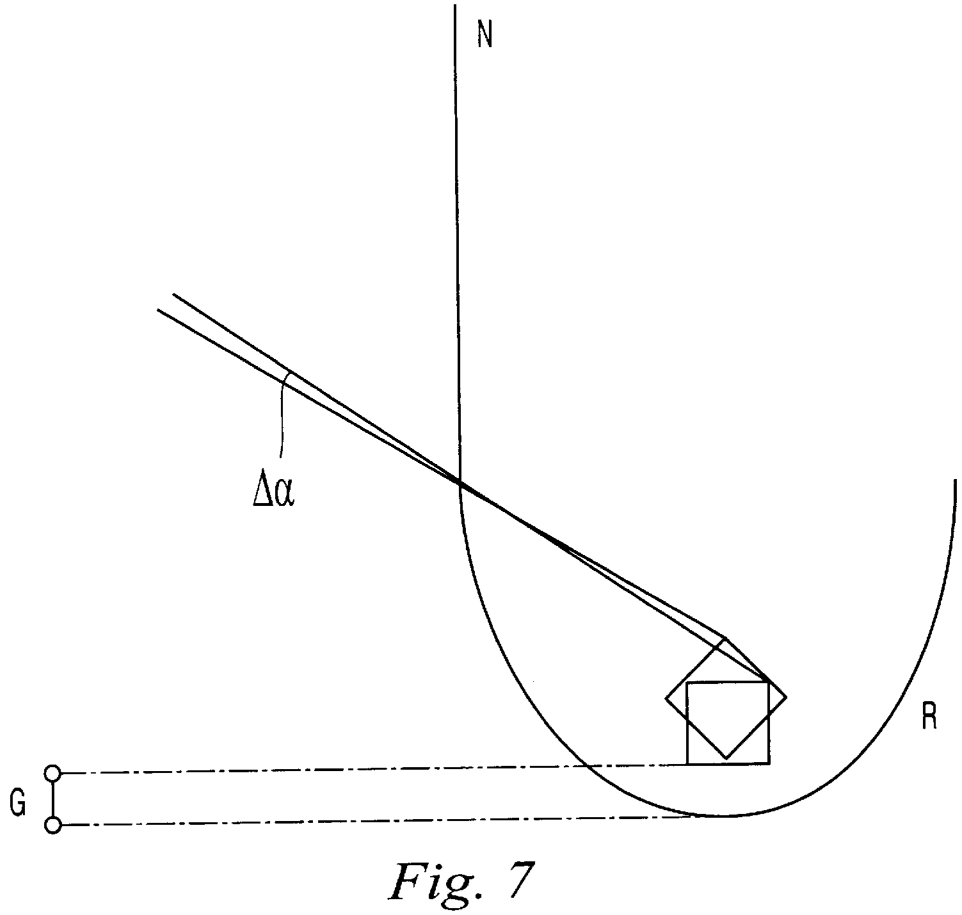
FIG. 7 shows FIGS. 5, 6 overlapped to each other in order to show the result of the different orientation of the light source.

In the design of the reflector, for shaping the light beam, the orientation of the lamps is important in order to insure the best possible control on the direction along which the direct light exits, if the lamp does not have a symmetry with respect to its axis. FIGS. 5–7 refer to the case of a lamp having an elongated dimension and a square cross-section. FIGS. 5, 6 show two opposite arrangements: one with two sides of the cross-section of the lamp parallel to the plane of the output mouth of the reflector and one rotated by 45° with respect to the former arrangement.

In FIGS. 5, 6, there is designated by R a generic lighting device with pre-determined height and width and by N there is designated the direction orthogonal to the output plane of the device. In the two FIGS. 5, 6, the sources are designated by $\Sigma$ and $\Sigma^1$. By keeping the distance G which represents the minimum distance between the source and the bottom of the reflector R constant, the output angle for the direct light (designated by $\alpha$ and $\alpha^1$ in FIGS. 5, 6) will become greater in the configuration shown in FIG. 5. The effect of the rotation of the source on the output angle of the light is best viewed in FIG. 7, where $\Delta\alpha$ represents the angular difference between the opposite rays coming from the two sources.

With distance G, height and diameter of the reflector being the same, it is therefore preferable to use the configuration of FIG. 6, in view of the laws presently in force which impose a maximum limit (55°) to the aforesaid angle.

Figure 17:
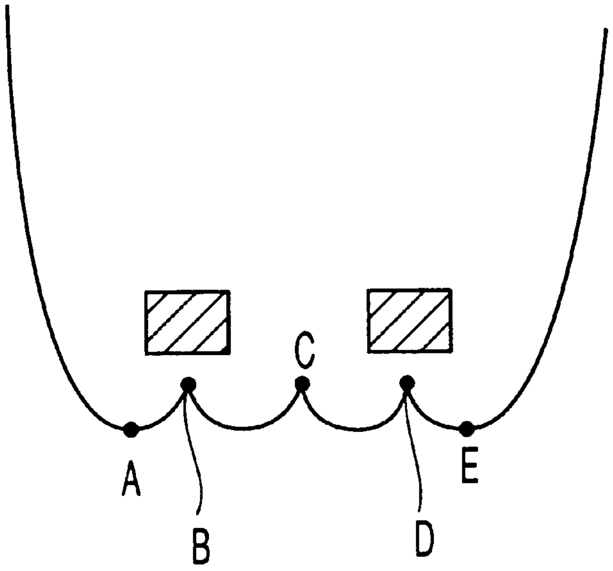
Figure 18:
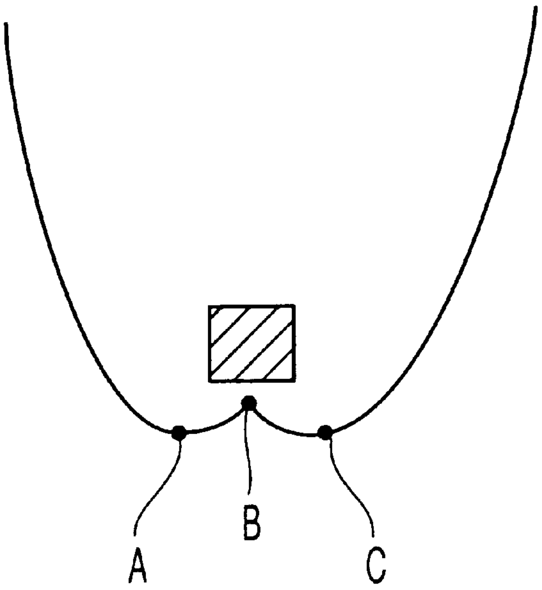

The substantially flat surface immediately adjacent to the sources reflects a part of the rays towards the sources themselves thus reducing the efficiency of the device. This drawback is due mainly to that the ideal surface must be cut because of the limitation on the overall height of the reflector, which is usually dictated by mounting conditions of the final device. Once the gap between the sources and the apex of the reflector as well as the distance between the sources are defined, out-of-axis parabola sections AB, BC, CD, DE "extruded" along the direction of maximum extension of the sources, as shown in FIGS. 17 and 18, are adopted in order to avoid that the rays return towards the sources, which maximizes the light flow at the output of the reflector. FIG. 17 shows a device with two sources, whereas FIG. 18 shows a device with a single source. AB, CD, BC, DE are parabola sections with differentiated axes and focal lengths in order to maximize the light flow at the output.

At design stage, the shape of the beam at the output of the device is controlled in two steps:

- by defining the proper dimensions of the reflector (height and width) which will have the task to limit the direct light (as shown in FIGS. 5–7);
- by designing the profile of the reflector so that the light is directed to the regions of interest. The whole is made so as to satisfy the following requirements:
  - cut-off angles not greater than a determined value, such as 55°,
  - maximum light flow;
  - output cross-section of the reflector having the required shape, e.g. circular,
  - curve defining the amplitude of the device which lies on a plane parallel to the upper surface of the lamps.

In a preferred embodiment, the reflector surface not only must provide a continuous passage between the ideal CPC cross-sections $\rho_1$ and $\rho_2$. according to equation (1), but also must contain the generic known curve $P_1$ which represents the shape of the reflector at the mouth. To this end, the function $\lambda$ which expresses the linear combination of $\rho_1$ and $\rho_2$ cross-sections must satisfy the equation:

$$\lambda = \frac{p_1 - \rho_2}{\rho_1 - \rho_2} \tag{2}$$

The reflector with a shape and a mouth analytically defined by equations (1),(2) provides the maximum efficiency of the light flow at the output and a control of the distribution thereof completely within the cut-off angle defined by the $\rho_1,\rho_2$ cross-sections.

As a matter of fact, the cross-sections of the surface (1) which continuously join the orthogonal cross-sections $\rho_1$ and $\rho_2$ generate no light flow beyond the cut-off angle. Furthermore, conditions can be imposed to the intermediate cross-sections in order to obtain a control of the distribution of the light pattern without affecting the criteria of continuity of the surface and without increasing the average number of reflections, i.e. keeping a maximum efficiency of the system.

Figure 13:
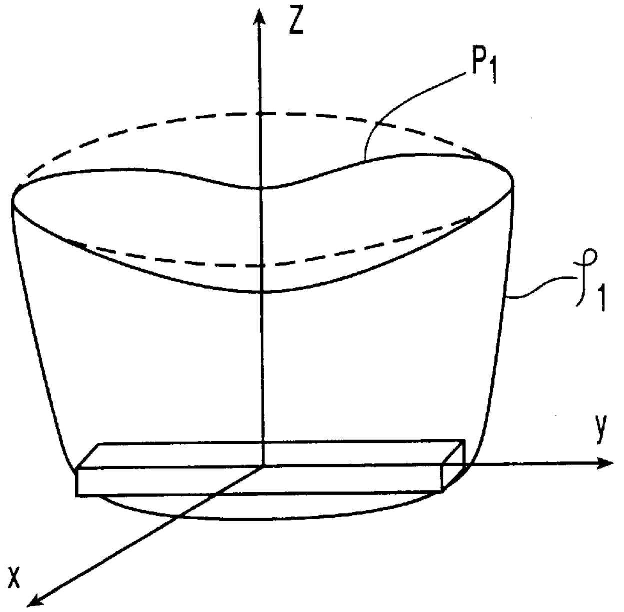
FIG. 13 is a further diagrammatic view of the reflector according to the invention which shows an example of the shape of the mouth of the reflector.

The curve $P_1$ which defines the mouth of the reflector may be contained within a plane parallel to the (x, y) plane or more generally it is a curve in space according to the representation of FIG. 13, where the walls of greater height are contained in the (x, y) plane of maximum extension of the source. Once the type of source and the value of the cut-off angle have been defined, the equation of the curve of the reflector mouth can be found in a fully analytical way.

Similarly, the shape of the curve $P_1$ can be controlled analytically to obtain a cut-off angle variable as a function of angle $\Psi$. In this manner, the curve $P_1$ also controls the shape of the projected light beam.

In another preferred and more generic variant, to the surface $\xi$ of the reflector there is imposed not only to pass through cross-sections $\rho_1$ and $\rho_2$ in planes (z, x) (z, y), but also to pass through a known curve $P_1$ which represents the mouth of the reflector and through a second curve $P_2$ for example contained in the plane z=constant between the source and the mouth of the reflector.

In this case, the shape of the reflector is of the type:

$$\xi=\lambda_1+\lambda_2\rho_1+(1-\lambda_2)\rho_2 \qquad (3),$$

where the $\lambda_1$ and $\lambda_2$ functions are made explicit by imposing that curves $P_1$ and $P_2$ are contained on surface (3).

The discussion may be generalized to the case in which more light sources are present in the device.

Figure 8:
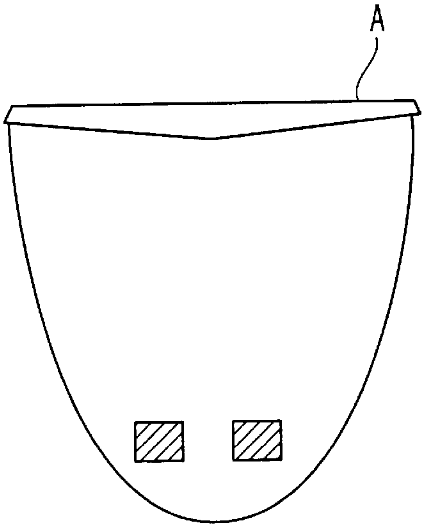
FIGS. 8, 9 are cross-sectional views in plane xz which show two variants of a further embodiment of the invention.
Figure 9:
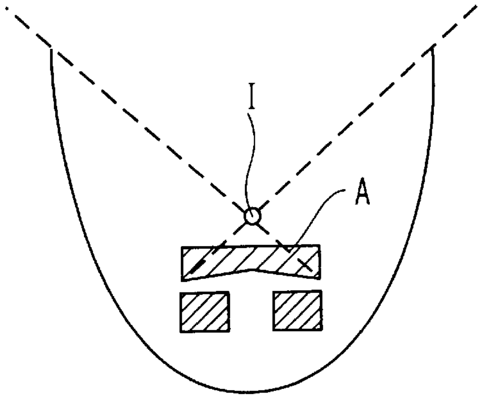

In a further embodiment of the present invention, in order to control the cut-off angle of the beam at the output of a device which is subject to geometric limitations, a so-called "axicon" is used, of the type indicated by A in FIGS. 8, 9, which refer to two variants of this further embodiment. The axicon is substantially a cone-like prism, known per se, able to shape a light beam similarly to a Fresnel lens, but contrary to the latter and contrary to any other prismatic element which has a plurality of cusps, it does not give raise to scattering or uncontrolled multiple reflections which direct a part of the light beam beyond the cut-off angle. It is therefore able, with the cut-off being the same, to provide a reduction of the height of the reflector.

FIGS. 8, 9 show two variants of the axicon with reference to an arbitrary reflector. In the case of FIG. 8, the axicon is placed on the mouth of the reflector, so that it affects the whole beam going out of the device. In the case of FIG. 9, it affects only the direct portion of the beam, while avoiding that the lamps become overheated. The shape of the axicon may be circular, but if it is positioned as shown in FIG. 9, it is preferably rectangular. The reflector may have a symmetry of revolution or a cylindrical symmetry.

Figure 14A:
FIGS. 14A, 14B are a side view and a plan view of a variant of a so-called axicon which can be used in the device according to the invention.
Figure 14B:
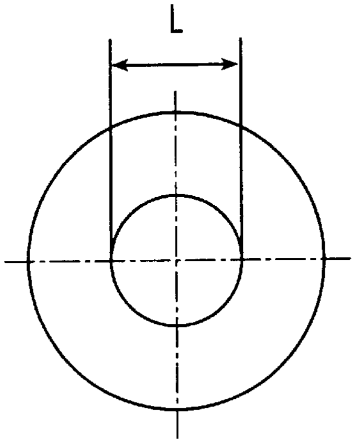

With reference to the variant of FIGS. 14A, 14B, the flat central area can be replaced by a hole according to the dotted lines in FIG. 14A. This central area indeed does not contribute to reduce the cut-off angle. Therefore, this variant has a reduced height as well as a reduced weight of the transparent optical element, which may be either of plastics or glass material.

Figure 15:
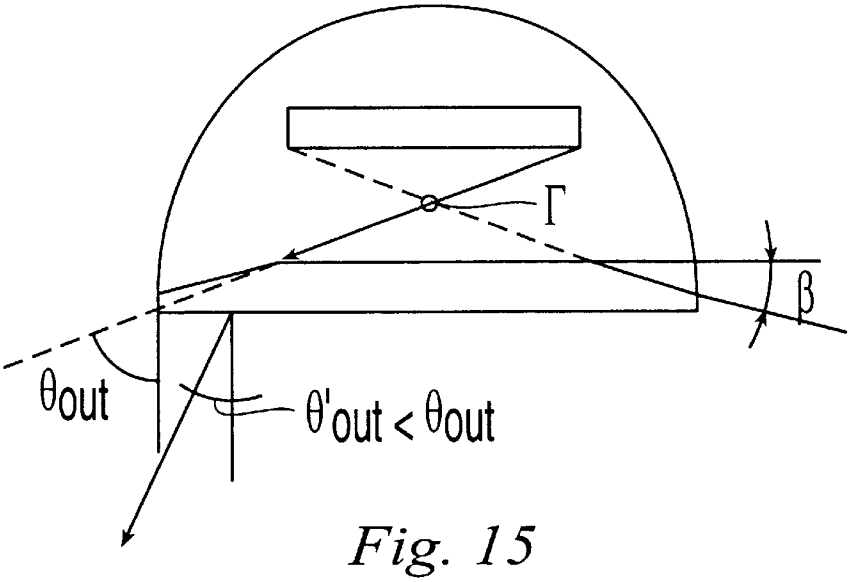
FIG. 15 is a diagrammatic view in cross-section of the device using the axicon of FIGS. 14A, 14B, FIGS. 16A, 16B are a side view and a plan view of a variant of FIGS. 14A, 14B, and FIGS. 17, 18 are cross-sectional views of two further variants of the device according to the invention.

The extension of the conical surface depends upon the diameter or in general the output dimension of the reflector, as well as on the position and shape of the sources, as shown in FIG. 15. The angle $\beta$ of the prismatic element will be always positive when the transparent element is positioned on the mouth of the reflector and can be negative if arranged above the intersection point I of the side rays which define the cut-off angle of the device. The introduction of the prismatic element reduced the cut-off angle in relation to the geometry of the reflector and the sources and the angle $\beta$ of the prism.

The value of the angle $\beta$ of the axicon element is preferably comprised between the values of 6° and 12°. For values lower than 6°, the decrease of the cut-off angle usually is not efficient, whereas for values of $\beta$ greater than 12° undesired effects of chromatic dispersion and an excessive reduction in efficiency may take place.

Figure 16A:
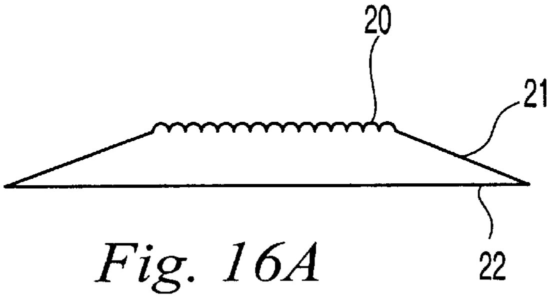
Figure 16B:
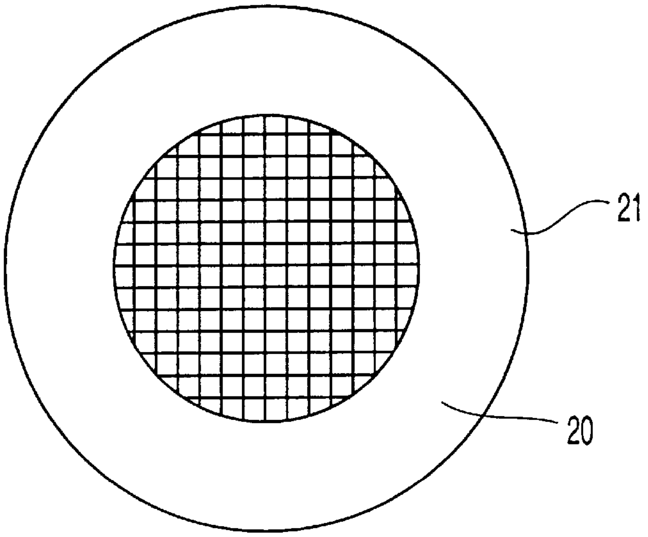

In a preferred variant, the upper or inner flat surface of the axicon transparent element is provided with micrometric or sub-micrometric projections which, according to the principle of diffraction or combined diffraction-refraction principles, have the function to contribute in distributing the light beam within the cut-off angle. A further function of the microlens is that of rendering the sources invisible, i.e. it acts as an aesthetical element with controlled diffusion. An example is constituted by a matrix of spherical microlenses cut with a square, rectangular or hexagonal shape with one side comprised between 50 microns and 1000 microns, and having an "f number", defined as the ratio of the focal length to the major diagonal, such that the divergence of the beam at the output is lower than that of the cut-off angle. The beam going out of the device is distributed again in a uniform pattern with a defined shape of the cross-section of the single microlenses constituting the matrix. This solution is shown in FIGS. 16A, 16B, where number 20 designates the matrix of spherical microlenses with square cut, numeral 21 designates the conical surface and numeral 22 designates the planar surface of the transparent element.

Naturally, while the principle of the invention remains the same, the details of construction and the embodiments may widely vary with respect to what has been described and illustrated purely by way of example, without departing from the scope of the present invention.

What is claimed is:

1. Reflector for lighting devices using one or more elongated sources, whose surface is characterized in that it has a continuous shape with different cross-sections in two main planes orthogonal to each other, said shape being expressed by the equation:

$$\xi=\lambda\rho_1+(1-\lambda)\rho_2, \qquad (1)$$

where $\rho_1$ and $\rho_2$ represent the ideal CPC cross-sections in said planes of the reflector, with a pre-defined cut-off angle, and $\lambda$ is a weight function, determined on the basis of an output shape of the reflector, which expresses the linear combination of $\rho_1$ and $\rho_2$ cross-sections.

2. Reflector according to claim 1, wherein a curve $P_1$ which defines an output mouth is contained in the above identified surface (1) and satisfies the equation:

$$\lambda=\frac{p_1-\rho_2}{\rho_1-\rho_2}, \qquad (2)$$

said curve $P_1$ defining a reflector with variable height.

3. Reflector according to claim 2, wherein the curve $P_1$ which defines the shape of the output mouth is such that the cut-off angle varies in relation to the angular position around the reflector main axis (z), so that the light beam is correspondingly shaped.

4. Reflector according to claim 1, wherein said reflector has no flat areas at its apex and wherein any cross-section lying in the plane passing through the reflector main axis (z) is analytically determined as a CPC with a pre-defined cut-off angle, calculated for the ideal source having the same extension as the length of the segment defined by the intersection of the plane containing axis z and the envelope of the actual source.

5. Reflector according to claim 1, said reflector having a shape $$\xi=\lambda_1+\lambda_2\rho_1+(1-\lambda_2)\rho_2 \qquad (3),$$

passing through two known curves of which the first curve $P_1$ defines the mouth of the reflector and the second curve $P_2$ being in the plane z=constant located between the source and the mouth of the reflector, in which $P_1$ and $P_2$ are two circles respectively in the planes $z=z_1$ and $z=Z_2$, whose upper edge is defined by circle $P_1$ and whose lower edge is defined by circle $P_2$, and by a second surface whose upper edge is defined by circle $P_2$ and having the shape defined by equation (1) up to an apex, where $\lambda_1$ and $\lambda_2$ are weight functions determined on the basis of imposing that curves $P_1$ and $P_2$ are contained on the surface.

6. Reflector according to claim 1, wherein the cross-sections other than cross-section $\rho_2$, which contains the axis of maximum extension of the source, are such as to render a light beam angularly symmetric around axis z.

7. Reflector for lighting devices using at least one source with different length in two directions orthogonal to each other, according to claim 1, wherein that reflector is the result of the intersection between the ideal CPC calculated for a theoretical source having a size identical to the maximum dimension along one axis (y) of the source to be used in the device, and the surface obtained by geometrically extruding the CPC profile calculated for the extension of the source along axis x; said intersection being radiused according to known smoothing techniques.

8. Reflector according to claim 1, wherein at an apex of the reflector it has parabola segments with differentiated axes and focal lengths, geometrically extruded along the direction of maximum extension of the sources and able to maximize the light flow from the device and particularly to avoid the return of light rays to the sources.

9. Reflector according to claim 1, wherein it is composed of two separate surfaces which can be separated for easy mounting of the device; the first surface being a surface of revolution around the main axis of the device defined by the output mouth of the light flow and by the intersection of plane z=0 which contains the axes of the source, the second surface going from plane z=0 up to an apex of the reflector.

10. Device with a reflector according to claim 1, wherein said reflector is provided with a transparent axicon in order to reduce the cut-off angle.

11. Device according to claim 10, wherein said transparent axicon is provided with a central flat area, with an annular shape and a central hole.

12. Device according to claim 11 wherein the flat area is provided with micrometric or sub-micrometric projections which, according to the principle of diffraction or combined principles of diffraction and refraction, distribute again the light beam within the beam angle.

13. Device according to claim 12, wherein said projections are constituted by a matrix of spherical microlenses cut with a multi-side shape, with a side comprised between 50 microns and 1000 microns and the ratio of the focal length to a major diagonal of each microlens is such that the divergence of the output beam is lower than that of the light beam defined by the geometry of the reflector.

14. Device according to claim 13, wherein said microlenses are shaped so as to form the shape of the beam according to the cross-section of the single microlenses constituting the matrix.

15. Device according to claim 14, wherein said microlenses are shaped so as to hide the elongated sources and to this end they are provided with values of "f number" lower than 5, said microlenses being therefore able to operate as a translucent element with a pre-defined angular diffusion.

16. Device according to claim 10, wherein the axicon is comprised of a cone-shaped prism having a base and angled walls disposed at an angle β relative to the base, the angle β being positive when the transparent axicon is located beyond an intersection point I of side rays from the sources which define the cut-off angle.

* * * * *